(12) United States Patent
Beringer et al.

(10) Patent No.: US 8,685,257 B2
(45) Date of Patent: Apr. 1, 2014

(54) LONG-TERM STORAGE OF POTABLE WATER IN METALLIC VESSELS

(75) Inventors: Durwood Mace Beringer, Suffield, CT (US); John W. Steele, New Hartford, CT (US); Timothy A. Nalette, West Stafford, CT (US)

(73) Assignee: Hamilton Sundstrand Space Systems International, Inc., Windsor Locks, CT (US)

( * ) Notice: Subject to any disclaimer, the term of this patent is extended or adjusted under 35 U.S.C. 154(b) by 0 days.

(21) Appl. No.: 12/635,102

(22) Filed: Dec. 10, 2009

(65) Prior Publication Data

US 2011/0139632 A1 Jun. 16, 2011

(51) Int. Cl.
*C02F 1/50* (2006.01)
*C02F 1/68* (2006.01)

(52) U.S. Cl.
USPC ............. 210/764; 210/766; 422/14; 148/276; 148/286; 148/606; 148/621; 148/633; 148/675; 148/708; 148/712

(58) Field of Classification Search
USPC ........ 210/764, 766, 205, 209, 241; 422/7, 14; 148/276, 277, 284, 285, 286, 579, 590, 148/591, 592, 605, 606, 621, 633, 675, 708, 148/712
See application file for complete search history.

(56) References Cited

U.S. PATENT DOCUMENTS

| | | | |
|---|---|---|---|
| 3,778,255 A * | 12/1973 | Ototani et al. | 420/41 |
| 4,596,611 A | 6/1986 | Dawes et al. | |
| 5,017,295 A | 5/1991 | Antelman | |
| 6,017,461 A | 1/2000 | Garvey et al. | |
| 6,231,690 B1 * | 5/2001 | Azuma | 148/591 |
| 7,601,755 B2 | 10/2009 | Arata | |
| 2005/0155939 A1 | 7/2005 | Stadelmann | |

FOREIGN PATENT DOCUMENTS

WO 2009044203 A1 4/2009

OTHER PUBLICATIONS

PRC-5002, Rev. E, NASA, Sep. 2006.*
Callahan, Michael R., et al. "Assessment of Silver Based Disinfection Technology for CEV and Future US Spacecraft" SAE Technical Paper Series. 2007-01-3258. Jul. 2007.
Adam, Niklas M. "Compatibility Study of Silver Biocide in Drinking Water with Candidate Metals for the Crew Exploration Vehicle Potable Water System" SAE International. 2009-01-2459. Jul. 2009.
The Extended European Search Report in counterpart European Application No. 10194634 filed Mar. 4, 2010.

* cited by examiner

*Primary Examiner* — Lucas Stelling
(74) *Attorney, Agent, or Firm* — Kinney & Lange, P.A.

(57) ABSTRACT

A method for controlling microbial growth in potable water stored in a vessel having a metallic surface includes heating the metallic surface to a temperature between about 480° C. (900° F.) and about 870° C. (1600° F.), exposing the metallic surface to oxygen during heating to oxidize potential reduction sites on the metallic surface and charging potable water containing silver ions to the vessel. A vessel having a metallic surface is prepared for long-term storage of potable water containing silver ions by heating the metallic surface to a temperature between about 480° C. (900° F.) and about 870° C. (1600° F.) and exposing the metallic surface to oxygen during heating to oxidize electropositive metals on the metallic surface or by treating the metallic surface with an aqueous solution containing on oxidizing agent to oxidize potential reduction sites on the metallic surface.

12 Claims, 7 Drawing Sheets

US 8,685,257 B2

LONG-TERM STORAGE OF POTABLE WATER IN METALLIC VESSELS

STATEMENT OF GOVERNMENT INTEREST

The U.S. Government may have the right in limited circumstances to require the patent owner to license others on reasonable terms as provided for by the terms of Contract No. DE-NNJ06TA25C awarded by the National Aeronautics and Space Administration.

BACKGROUND

Long-term storage of potable water is necessary for certain missions carried out beyond the Earth's stratosphere. Spacecraft such as the Space Shuttle or the Orion are or will be used to transport astronauts, crew and other personnel from Earth to orbiting space stations, the moon or Mars. A source of potable water is needed for those aboard the spacecraft. While water recycling systems exist, they can be complicated, subject to failure and may not be able to provide adequate quantities of water on demand. Thus, in some circumstances, a source of potable water in a storage tank or other vessel may be used to carry the water needed during the course of the mission or provided in addition to a water recycling system. In these cases, water is typically charged to the tank or vessel on the ground, shortly before launch.

Long-term storage of potable water on a spacecraft is desirable in situations where a spacecraft will be unable to take on additional supplies of potable water during its mission or where launch is delayed (eliminating the need to empty the tank and recharge additional potable water). For example, potable water may need to be stored on a spacecraft for many weeks during travel to Mars or when the spacecraft has an extended docking period at a space station and potable water is required for the return trip to Earth. In some cases, the potable water may remain on the spacecraft until a return voyage which may be many days, weeks or months after the initial departure.

Silver ions are known to exhibit a toxic effect on bacteria, viruses, algae and fungi, similar to some heavy metals like lead and mercury, but without the high toxicity to humans normally associated with those heavy metals. Silver biocides have been used to preserve sources of potable water in vessels made of plastic and other polymers. Silver ions at levels between about 0.02 parts per million (ppm) and about 0.4 ppm are able to maintain water quality at or below microbial limits of approximately 50 CFU/mL (colony forming units per milliliter). However, plastic vessels are typically not robust enough to withstand spacecraft launch and landing conditions. Metallic vessels are strong enough for use on spacecraft, but studies have shown that silver ions are rapidly depleted in vessels having metallic surfaces. Initial concentrations of silver ions present in potable water up to 0.4 ppm can be reduced below detection limits (and effective biocidal levels) within 28 days of exposure to some metallic surfaces when the ratio of metallic surface area to water volume approximates the ratio expected in a water storage tank. The depletion time may be shortened when the surface area to volume ratio is higher, as in a tube. In order for metallic vessels to be useful for long-term storage of potable water containing silver biocides, depletion of silver ions caused by metallic surfaces must be reduced or eliminated.

SUMMARY

A method for controlling microbial growth in potable water stored in a vessel having a metallic surface includes heating the metallic surface to a temperature between about 480° C. (900° F.) and about 870° C. (1600° F.), exposing the metallic surface to oxygen during heating to oxidize potential reduction sites on the metallic surface, and charging potable water containing silver ions to the vessel.

A method for preparing a vessel having a metallic surface for long-term storage of potable water containing silver ions includes heating the metallic surface to a temperature between about 480° C. (900° F.) and about 870° C. (1600° F.) and exposing the metallic surface to oxygen during heating to oxidize electropositive metals on the metallic surface.

Another method for preparing a vessel having a metallic surface for long-term storage of potable water containing silver ions includes forming an aqueous solution containing on oxidizing agent and treating the metallic surface with the aqueous solution containing on oxidizing agent to oxidize potential reduction sites on the metallic surface.

Another method for controlling microbial growth in potable water stored in a vessel having a metallic surface includes silver plating a portion of the metallic surface to reduce potential sites for silver reduction on the metallic surface and charging water to the vessel.

A vessel for long-term storage of potable water includes a metallic surface, wherein the metallic surface of the vessel is oxidized to decrease reduction potential of the metallic surface, and wherein the metallic surface is treated with a solution containing silver ions to further decrease reduction potential of the metallic surface.

A vessel for containing potable water comprising silver ions includes a metallic surface, wherein a majority of electropositive elemental metals present on the metallic surface are oxidized to prevent reduction of silver ions, an outlet for discharging potable water from the vessel and a filter for preventing microbes from exiting the vessel at the outlet.

DETAILED DESCRIPTION

Figure 1:
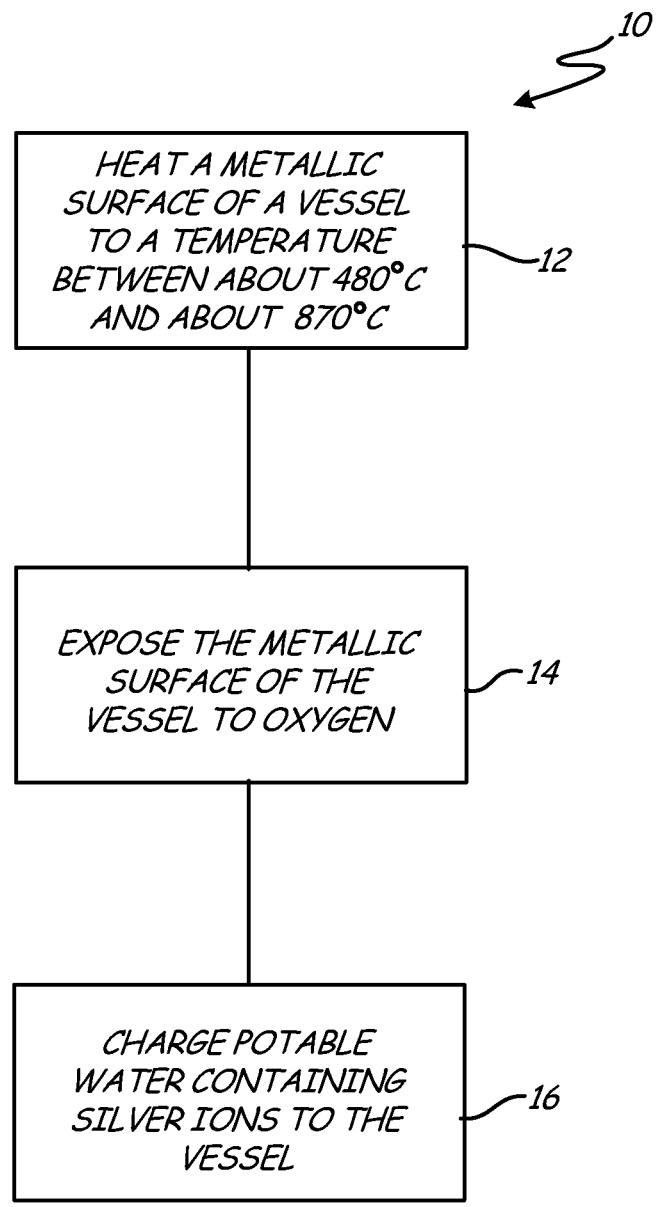
FIG. 1 is a flow diagram illustrating a method for controlling microbial growth in potable water stored in a vessel having a metallic surface.

The present invention provides a method for controlling microbial growth in potable water stored in a metallic vessel and a method for preparing a metallic vessel suitable for long-term storage of potable water containing a silver biocide. The present invention allows for a "zero maintenance" method of providing long-term storage of potable water. Potable water can be charged to a treated metallic vessel and no additional steps are necessary to maintain a supply of potable water. Potential sites on surfaces of the metallic vessel capable of silver reduction are decreased by oxidation to lessen and prevent subsequent reduction of silver ions in the potable water. Oxidizing and/or passivating metallic surfaces of the vessel provides a vessel with limited reduction potential that better preserves silver ions in stored potable water.

Potable water can utilize multiple means of microbial control. Potable water can be charged to a storage tank or vessel with a silver salt, such as silver fluoride, to produce a solution of water and silver ions. The silver ions in solution serve as a biocide to control and limit microbial growth in properly precleaned and disinfected systems. The tank or vessel can also employ a filtration system, such as a point-of-use filter, in addition to the silver biocide. A filter having a pore size diameter of about 0.1 microns can prevent some microbes that may be present in the potable water from leaving the tank or vessel and being used or consumed by spacecraft personnel. Potable water must generally meet certain quality requirements prescribed by regulation or customer or end user specification.

Various silver salts can serve as a source of silver ions that act as biocides to limit growth of bacteria, viruses, algae and fungi (collectively referred to as "microbes") in aqueous solutions. Suitable silver salts include silver (I) fluoride, silver sulfate, silver sulfite, silver nitrate, silver nitrite, silver acetate and combinations thereof. Practically speaking, any silver compound that dissociates in water to yield a silver ion and an associated counterion can serve as a source of silver ions. These silver compounds are generally suitable as long as the counterion does not provide unacceptable levels of toxicity. Silver ions can also be electrolytically generated to eliminate the presence of counterions.

Concentrations of silver ions as low as about 0.02 ppm to about 0.05 ppm can exhibit antimicrobial properties. Concentrations of silver ions up to about 0.4 ppm in potable water are generally considered safe for humans. While levels of silver ions greater than 0.4 ppm continue to provide antimicrobial effects, higher levels also begin to present toxicity hazards (e.g., argyria) to humans. Thus, most regulations or specifications for potable water containing silver require that the silver ions be below a certain threshold (e.g., 0.5 ppm). Potable water utilizing silver ions as a biocide is generally considered both effective from an antimicrobial standpoint and acceptable from a toxicity standpoint when the silver ion concentration is between about 0.05 ppm and about 0.4 ppm.

As noted above, plastic vessels generally lack the strength and integrity to serve as potable water storage tanks and vessels on some spacecraft. Various spacecraft components, including water storage tanks and vessels, can be subjected to jarring, vibrations and other forces during takeoff and landing. As a result of these forces, metal storage tanks and vessels typically offer more acceptable physical properties. Metal tanks and vessels are better able to withstand the forces exerted on spacecraft components during takeoff and landing. Suitable metals for use in storage tanks and vessels and related components, such as valves, include various forms of stainless steel, including austenitic chromium-nickel alloys (300 series) and ferritic and martensitic chromium alloys (400 series); other metal alloys such as austenitic nickel-chromium based alloys (e.g., Inconel alloys, available from Special Metals Corp., New Hartford, N.Y.) and ferritic alloys (e.g., E-BRITE®, available from Allegheny Ludlum Corporation, Brackenridge, Pa.) and combinations thereof.

Ordinarily, when a metal or metal alloy surface (collectively referred to as a "metallic surface") comes into contact with a solution containing silver ions, the silver ions can react with atoms on the metallic surface. Without being bound to a particular theory, it is believed that the silver ions can be reduced by interacting with a reducing agent present at the metallic surface. Some electropositive elemental metals (e.g., lithium, sodium, magnesium, iron, nickel, zinc and aluminum) are commonly present in metal alloys at varying concentrations depending on the particular alloy. In particular, iron and nickel are present in many types of stainless and corrosion-resistant steels. It is believed that electropositive metals such as these can readily give up their valence electrons and act as reducing agents. Silver ions ($Ag^+$) in solution are reduced by electropositive metals when the solution contacts a metallic surface having these metals. For example, silver ions are reduced to elemental silver according to the following equation:

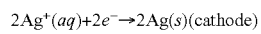
$$2Ag^+(aq) + 2e^- \rightarrow 2Ag(s) \text{(cathode)}$$

Silver can accept an electron in its 5s atomic orbital so that the 5s orbital is filled. Elemental silver (Ag(s)) does not provide the same antimicrobial effect provided by silver ions. The elemental silver can drop out of solution or it can form individual or clusters of nodules on the metallic surface.

For Inconel 718 surfaces, for example, electrons are readily available from nickel present in and on the Inconel 718 surface. Nickel readily oxidizes to give up electrons according to the following equation:

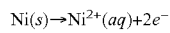
$$Ni(s) \rightarrow Ni^{2+}(aq) + 2e^-$$

On Inconel 718 surfaces, it is believed that areas rich in silicon and niobium (the most noble areas of the Inconel 718 surface) can serve as the cathode for silver reduction. Silver ions are reduced to elemental silver and tend to form silver nodules in these areas. The silver could also form other compounds and complexes with other constituents on the Inconel 718 surface.

Studies have shown that concentrations of silver ions in aqueous solutions stored in metal stainless steel vessels (Inconel 718 and E-BRITE®) decrease over time. Testing performed by Applicants confirms these studies' results. An antimicrobial concentration of silver ions in solution dropped below the detection limit (~0.05 ppm) after about 28 days when in contact with an Inconel 718 surface. An antimicrobial concentration of silver ions in solution dropped below the detection limit (~0.05 ppm) after about 115 days when in contact with an E-BRITE® surface. In both cases, the concentrations of silver ions showed a consistent downward path. These studies confirm that after a certain period of time (no later than about 28 days for Inconel 718 and no later than about 115 days for E-BRITE®), potable water having a silver biocide and contained within a metallic vessels no longer possesses adequate concentrations of silver ions to exhibit the desired antimicrobial effects.

A method according to the present invention prepares metallic surfaces such as Inconel 718 and E-BRITE® for long-term storage of potable water containing silver ions where the silver ions remain in solution for an extended period compared to the untreated metallic surfaces described above.

In one embodiment, the metallic surface of a vessel is oxidized to decrease the potential of electropositive metals present on the metallic surface to act as reducing agents. FIG. 1 illustrates a flow diagram illustrating method 10 for controlling microbial growth in potable water stored in a vessel having a metallic surface. Method 10 includes heating the metallic surface of the vessel to an elevated temperature (step 12) and exposing the metallic surface to oxygen (step 14) to form an oxide layer. After cooling, potable water containing silver ions is then charged to the vessel (step 16).

Electropositive metals include alkali metals, alkaline earth metals and some transition metals, such as nickel. For Inconel 718 and E-BRITE®, nickel is believed to be the primary potential reducing agent and the main electropositive metal of concern on the metallic surface, but other electropositive metals may also be present. An electropositive metal typically contains one or more electrons in its outermost (valence) electron shell. In the case of alkali metals, alkaline earth metals and zinc, the electropositive metal readily gives up electrons to hold a positive charge and have a closed and complete outer electron shell. In the case of transition metals, electrons from a d- or s-orbital are given up to reach a more stable arrangement of electrons. The electrons these electropositive metals give up can react with silver ions contained in potable water to reduce the silver ions and form elemental silver or other silver compounds as described above. For the purposes of this patent application, oxidation is considered the loss of electrons by a molecule, atom or ion. By oxidizing the electropositive metals present on the metallic surface, the electropositive metals no longer have electrons to give up. Oxidizing the electropositive metals prevents the metals from reacting with and reducing silver ions.

The metallic surface of the vessel is oxidized by heating the metallic surface and exposing the metallic surface to oxygen (step 12). Depending on its composition, the metallic surface is heated to temperatures between about 480° C. (900° F.) and about 870° C. (1600° F.). In exemplary embodiments, the lowest temperature that adequately treats the metallic surface so that it reduces depletion of silver ions is used. Using low temperatures prevents the formation of heavy oxide scale, which increases surface roughness. The metallic surface is maintained at an elevated temperature for various periods of time depending on the composition of the metallic surface. Suitable times can vary from one metallic surface to another between about 1 hour and about 24 hours. Higher concentrations of electropositive metals on the metallic surface can require longer periods of time at elevated temperature. The temperature of the metallic surface can be varied during this time (e.g., held for a prescribed period of time and then increased or decreased, etc.).

For at least part of the time the metallic surface is elevated to a high temperature, the metallic surface is exposed to a source of oxygen (step 14). The exposure of the metallic surface to oxygen at high temperature causes metals on the metallic surface susceptible to oxidation (including reducing agents and electropositive metals) to oxidize (i.e. lose electrons). For example, nickel (Ni), a constituent of both Inconel 718 and E-BRITE®, present on the metallic surface can react with oxygen and other available atoms to form nickel oxide ($NiO_2$), nickel carbonate ($NiCO_3$), nickel hydroxide ($Ni(OH)_2$) and combinations thereof. The metallic surface does not need to be exposed to pure oxygen for oxidation to occur. Normal air contains enough oxygen to facilitate oxidation of the metals on the metallic surface.

Once oxidized, the reducing potential of nickel and other metals that can serve as reducing agents is decreased. Once oxidized, nickel (as $NiO_2$, $NiCO_3$ and $Ni(OH)_2$) does not readily give up electrons that might interact with silver ions that come into contact with the metallic surface. The electrons that were once readily available are now involved in bonds with other atoms. The metallic surface is heated and exposed to oxygen for a period sufficient to oxidize enough potential reduction sites on the metallic surface so that potable water containing silver ions later charged to the vessel (step 16) maintains the appropriate concentration of silver ions for a prescribed length of time. In situations where the potable water is stored for up to 15 months, oxidation of all potential reducing sites on the metallic surface must be complete or nearly complete. Generally, oxygen exposure lasting between about 60 minutes and about 4 hours can be sufficient to fully oxidize or nearly fully oxidize most potential reducing sites present on the metallic surface.

The steps of heating the metallic surface and exposing the metallic surface to oxygen are in addition to normal tempering and precipitation hardening steps. As shown below in Example 1, typical tempering and precipitation hardening steps do not decrease potential reducing sites on the metallic surface. In an exemplary embodiment, the heating and oxygen exposure steps described above can follow normal tempering or precipitation hardening steps to eliminate the time needed for post-tempering cooling as well as the additional energy needed to reheat the metallic surface.

Figure 2:
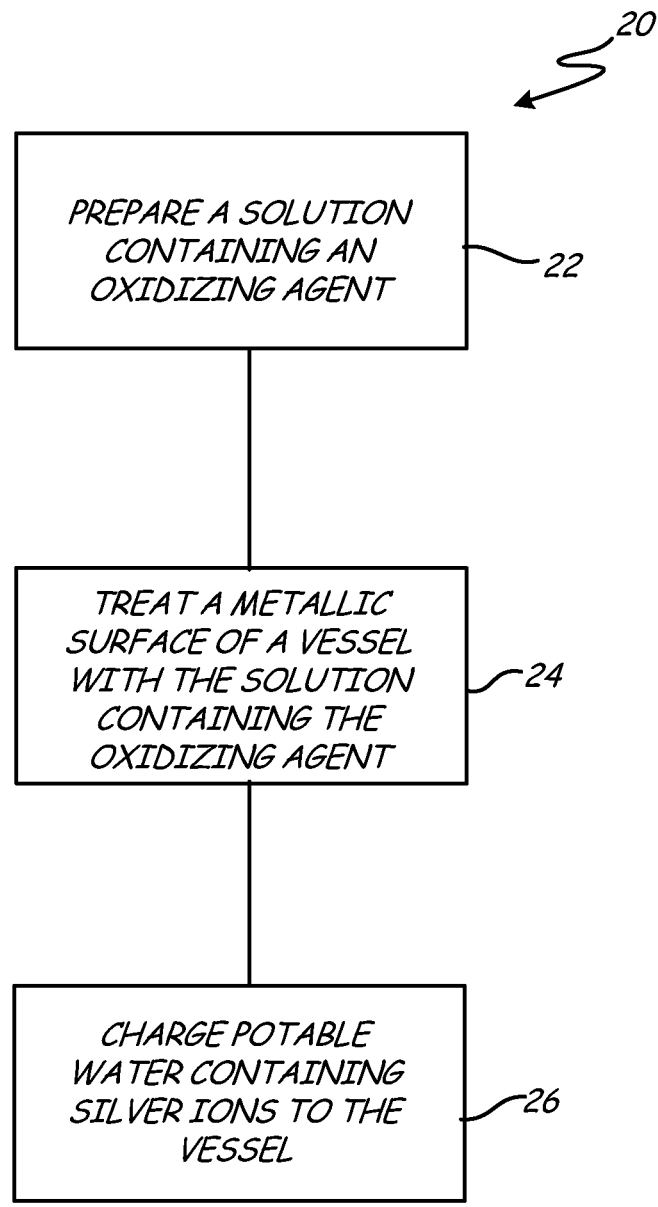
FIG. 2 is a flow diagram illustrating an alternative method for controlling microbial growth in potable water stored in a vessel having a metallic surface.

In another embodiment, the metallic surface of a vessel is passivated by exposing and treating the metallic surface with a solution containing an oxidizing agent. FIG. 2 illustrates a flow diagram illustrating method 20 for controlling microbial growth in potable water stored in a vessel having a metallic surface. Method 20 includes preparing a solution containing an oxidizing agent (step 22) and treating the metallic surface of the vessel with the solution containing an oxidizing agent (step 24). Potable water containing silver ions is then charged to the vessel (step 26).

A solution containing an oxidizing agent is prepared (step 22) and added to the vessel (step 24) to passivate the metallic surface before the metallic surface is exposed to the potable water containing silver ions that will be charged to the vessel. The solution containing the oxidizing agent reacts with electropositive metals on the metallic surface to oxidize the electropositive metals. The electropositive metals give up one or more electrons when they react with the oxidizing agent. An oxidizing agent is an atom or compound that gains electrons in a redox chemical reaction. In the redox reaction, the oxidizing agent gains electrons and is reduced, and the reducing agent loses electrons and is oxidized.

Various oxidizing agents can be used to decrease the number of sites on the metallic surface of the vessel that can react with and reduce silver ions. Nitric acid, peroxides and halogen compounds are but a few types of oxidizing agents. Various concentrations of oxidizing agents can be added to the solution. A solution with a higher concentration of an oxidizing agent can oxidize electropositive metals on the metallic surface more quickly than a solution with a lower concentration of the oxidizing agents. Some oxidizing agents also react more quickly and more completely than others. The metallic surface is exposed to the solution containing the oxidizing agent for a period sufficient to oxidize enough potential reduction sites on the metallic surface so that potable water containing silver ions charged to the vessel maintains the appropriate concentration of silver ions for a prescribed length of time. In situations where the potable water is stored for up to 15 months, oxidation of all potential reducing sites on the metallic surface must be complete or nearly complete. Generally, exposure to the solution containing the oxidizing agent for between about 2 days and about 3 weeks is sufficient to fully oxidize or nearly fully oxidize most potential reducing sites present on the metallic surface. Once exposure and treatment is complete, the solution containing the oxidizing agent is removed from the vessel and potable water containing silver ions can be charged to the vessel (step 26).

In one embodiment, an aqueous solution of silver (I) fluoride (AgF) serves as the solution containing the oxidizing agent. Silver fluoride is added to water to provide a concentration between about 10 ppm silver fluoride and about 200 ppm silver fluoride. The metallic surface is then exposed and treated with this solution for a period of time up to about 3 weeks. As the electropositive metals (reducing agents) on the metallic surface react with the silver ions in solution, the electropositive metals are oxidized and the silver ions are reduced. The electropositive metals oxidized during these reactions are no longer capable of later reducing additional silver ions. After the necessary exposure time, the silver fluoride solution is removed from the vessel. Potable water containing silver fluoride at the target level (generally around 0.4 ppm) is then charged to the vessel.

Figure 3:
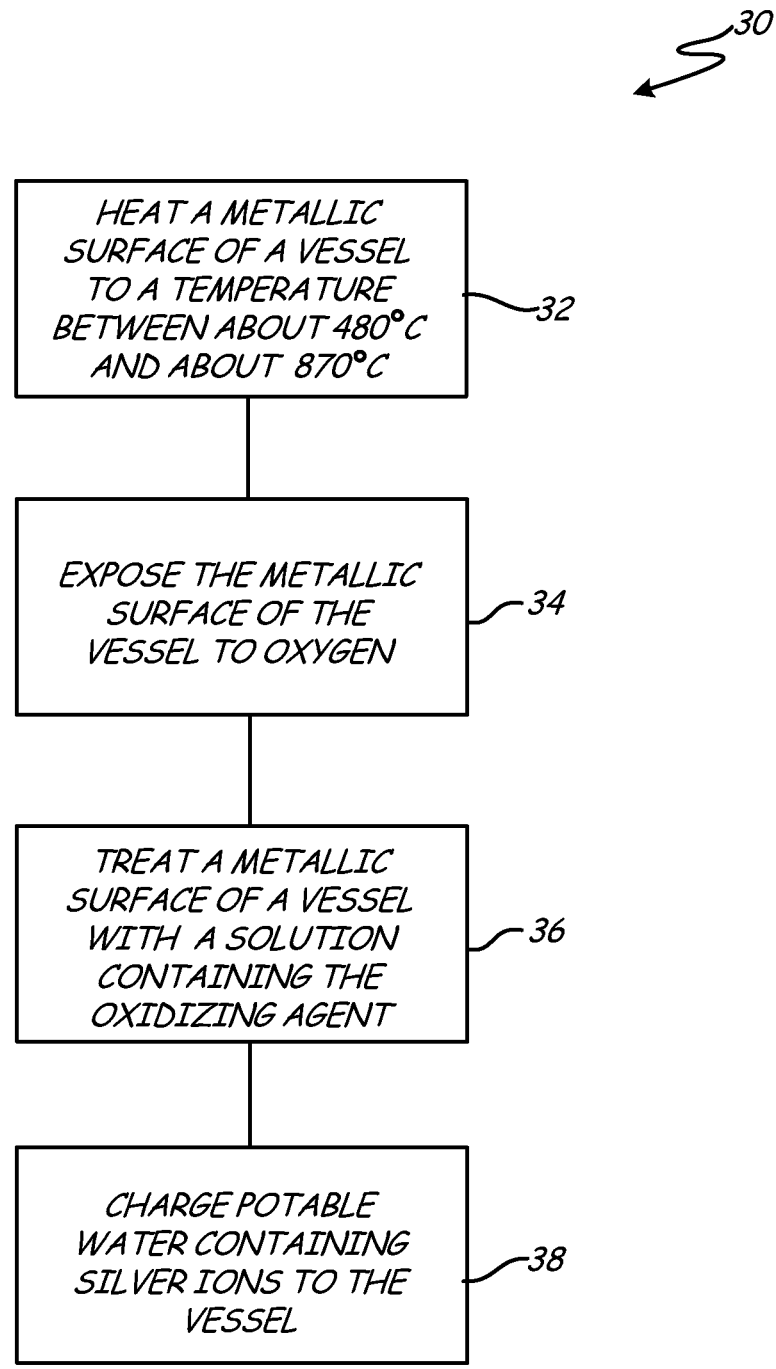
FIG. 3 is a flow diagram illustrating another method for controlling microbial growth in potable water stored in a vessel having a metallic surface.

In another embodiment, the high temperature oxidation treatment and the passivation treatment using a solution containing an oxidizing agent are combined to provide a metallic surface with little to no reduction potential. FIG. 3 illustrates a flow diagram illustrating method 30 for controlling microbial growth in potable water stored in a vessel having a metallic surface. Method 30 includes heating the metallic surface of the vessel to an elevated temperature (step 32), exposing the metallic surface to oxygen (step 34) and treating the metallic surface of the vessel with a solution containing an oxidizing agent (step 36). Potable water containing silver ions is then charged to the vessel (step 38). The high temperature oxidation treatment (steps 32 and 34) is performed as described above. The passivation treatment described above (step 36) then follows the high temperature oxidation treatment. The passivation treatment further oxidizes any potential reduction sites on the metallic surface that may have escaped oxidation during the high temperature oxidation treatment. The subsequent passivation treatment further reduces the reduction potential of electropositive metals on the metallic surface. By combining the high temperature oxidation and passivation treatments, additional benefits to the quality of the potable water are observed.

While maintaining a desired antimicrobial concentration of silver ions in potable water stored in a vessel having a metallic surface is a primary goal of the present invention, the treatments that serve to maintain silver ion concentration also provide an additional effect with respect to nickel concentrations in the potable water. The high temperature oxidation and oxidizing agent passivation treatments also affect the level of nickel ions in the potable water stored in the treated vessel. Like some other metals, nickel usually cannot exceed certain concentration limits in drinking and potable water. Generally speaking, nickel concentrations should be below 0.3 ppm in drinking water. In an Inconel 718 vessel treated with high temperature oxidation alone, the nickel concentration rose from below the detection limit (0.05 ppm) at the start of the test to about 0.1 ppm after about 6 months and about 0.25 ppm after about 10 months. While the silver ions present in potable water stored in the treated vessel remained at acceptable concentration levels, the level of nickel in the potable water increased. The consistent rise in nickel concentration suggests that storage in a vessel with high temperature oxidation alone may be adequate only for slightly longer than about 10 months. However, in an Inconel 718 vessel treated with both high temperature oxidation and oxidizing agent passivation, the nickel concentration remained below the detection limit after 15 months. When the high temperature oxidation and passivation treatments were combined, both the silver ion concentration and the nickel concentration were well within desired limits.

Figure 4:
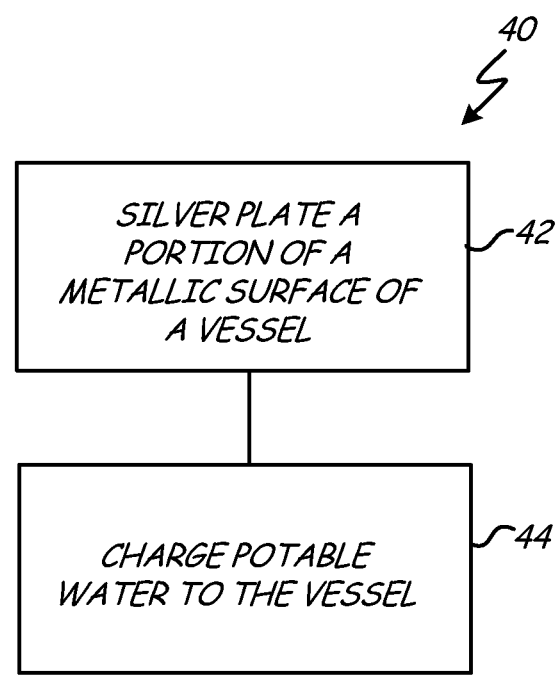
FIG. 4 is a flow diagram illustrating yet another method for controlling microbial growth in potable water stored in a vessel having a metallic surface.

In another embodiment, silver plating is performed on a portion of a metallic surface of a vessel. FIG. 4 illustrates a flow diagram illustrating method 40 for controlling microbial growth in potable water stored in a vessel having a silver plated metallic surface. Method 40 includes silver plating a portion of the metallic surface (step 42). In exemplary embodiments, silver plating is performed to meet Federal Specification QQ-S-365D or ASTM International Test Method (ASTM) B700-08. Once a portion of the metallic surface has been silver plated, potable water is then charged to the vessel (step 44). As shown below in Example 1, silver plating the entire metallic surface of the vessel provides water having a silver ion concentration too high for human use and consumption. However, if a portion of the metallic surface is silver plated, that portion of the metallic surface can provide and maintain the necessary silver ion concentration in stored potable water. Since stored water will not always be in contact with all metallic surfaces of the vessel, in exemplary embodiments, the portion of the metallic surface that is silver plated is located within the vessel so that it comes into contact with the potable water as it is dispensed (e.g., metallic surfaces in or near an outlet tube, duct or needle).

The potable water charged to the vessel may or may not contain silver ions depending on the surface area of the portion of the metallic surface that was silver plated relative to the volume of the vessel. For example, a portion of the metallic surface can be silver plated to maintain silver ion concentration of potable water having an initial concentration of silver ions. Alternatively, a larger portion of the metallic surface can be silver plated to contribute silver ions to potable water charged to the vessel that does not contain silver ions. In the latter case, additional time may be necessary before dispensing potable water to ensure that silver ions from the silver plating enter the potable water charged to the vessel. In exemplary embodiments, the portion of the metallic surface that is silver plated is located within the vessel so that it comes into contact with the potable water as it is dispensed (e.g., metallic surfaces in or near an outlet tube, duct or needle).

Method 40 can also be used for preparing vessels and metallic surfaces for purposes other than providing potable water. Method 40 presents the potential to provide silver ion concentrations in stored water higher than what is required and desirable in potable water as shown in Example 1. Other applications aside from the storage of potable water may benefit from increased levels of silver ion concentration.

EXAMPLES

Candidate potable water storage vessel materials were subjected to different treatments and then exposed to potable water containing silver ions. Experiments were performed using material test panels having dimensions to provide a surface area to volume ratio equivalent to a full potable water storage tank currently used on the Space Shuttle. Multiple test panels were used for each condition examined. The potable water used had a concentration of 0.35±0.05 ppm silver. Silver (I) fluoride (AgF) was used to provide silver ions to the potable water, and the silver fluoride had a purity of 99% or better. The average concentration of silver ions in the potable water in the vessels was monitored over time.

Example 1

Inconel 718

Figure 5:
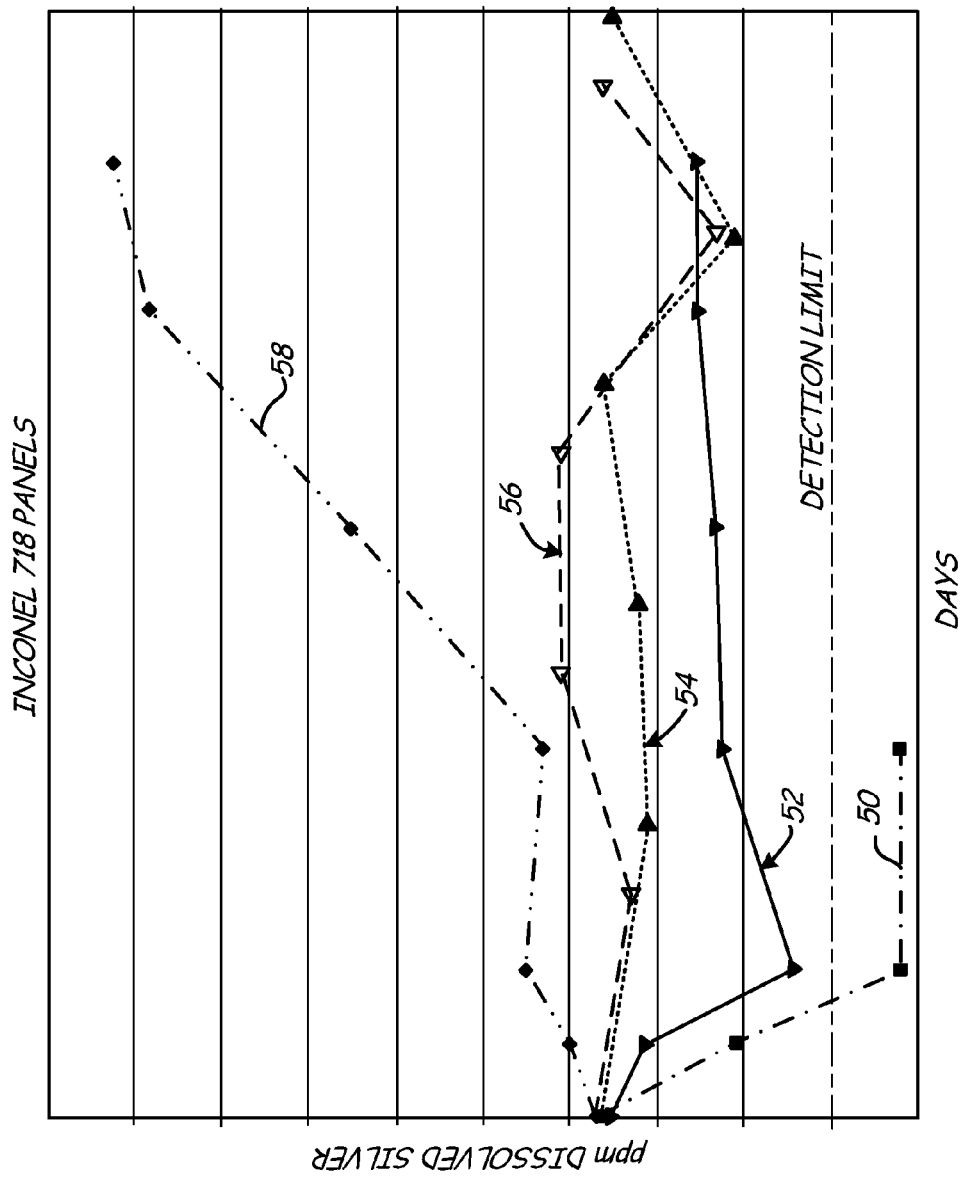
FIG. 5 is a graph illustrating silver ion concentrations in solutions contacting Inconel 718 surfaces.

FIG. 5 and Tables 1-5 illustrate results for the Inconel 718 panel study. A set of untreated (baseline) Inconel 718 test panels received no treatment before exposure to potable water containing silver ions. Results for the untreated Inconel 718 test panels (reference numeral 50) showed a rapid decrease in the amount of silver ions in the potable water. After 4 weeks, the silver ion concentration in the potable water was below the detection limit (0.05 ppm). Typical tempering and precipitation hardening treatments did not oxidize or passivate Inconel 718 test panels to prevent depletion of silver ions when they were exposed to the test panels.

TABLE 1

Untreated Inconel 718

| Time (days) | Dissolved silver (ppm) |
| --- | --- |
| 0 | 0.36 |
| 14 | 0.21 |
| 28 | 0.02 |
| 77 | 0.02 |

A set of Inconel 718 test panels received high temperature oxidation treatment before exposure to potable water containing silver ions. The test panels were heated to 590° C. (1100° F.) for 2 hours. The test panels were also exposed to air at the elevated temperature for those 2 hours. Once the test panels had cooled, they were exposed to potable water containing silver ions. Results for the Inconel 718 test panels receiving high temperature oxidation treatment (reference numeral 52) showed an initial decrease in silver ion concentration after 4 weeks, but from there the concentration increased and leveled off around 0.25 ppm (71% of the initial concentration) out to about 45 weeks. The high temperature oxidation treatment demonstrated the ability to maintain an acceptable antimicrobial level of silver ions in potable water for up to 45 weeks for Inconel 718 surfaces.

TABLE 2

Inconel 718 - High Temperature Oxidation Treatment

| Time (days) | Dissolved silver (ppm) |
| --- | --- |
| 0 | 0.35 |
| 14 | 0.31 |
| 28 | 0.14 |
| 77 | 0.22 |
| 117 | 0.23 |
| 188 | 0.25 |
| 314 | 0.25 |

The dissolved silver values were corrected for container adsorption.

A set of Inconel 718 test panels received high temperature oxidation treatment followed by treatment with a solution having a high concentration of silver fluoride (passivation treatment). As before, the test panels were heated to 590° C. (1100° F.) and exposed to air at that temperature for 2 hours. Once the test panels had cooled, each panel was exposed to a concentrated silver solution (silver fluoride) having a silver concentration of 50 ppm. The test panels were exposed to the concentrated silver solutions for 3 weeks. After 3 weeks, the concentrated silver solutions were removed, the test panels were rinsed with deionized water and the test panels were exposed to potable water containing silver ions. Results for the Inconel 718 test panels receiving high temperature oxidation treatment followed by passivation treatment (reference numeral 54) showed a fairly steady level of silver ions between about 0.31 ppm (84% of the initial concentration) and about 0.36 ppm (97% of the initial concentration) out to about 62 weeks. At about 43 weeks, the silver ion concentration dropped to 0.21 ppm, but was back up to 0.35 ppm at about 62 weeks. The high temperature oxidation treatment combined with the oxidizing agent passivation treatment demonstrated the ability to maintain acceptable antimicrobial levels of silver ions near initial levels in potable water for up to 62 weeks for Inconel 718 surfaces.

TABLE 3

Inconel 718 - High Temperature Oxidation Treatment & Passivation

| Time (days) | Dissolved silver (ppm) |
| --- | --- |
| 0 | 0.37 |
| 40 | 0.31 |
| 111 | 0.32 |
| 181 | 0.36 |
| 300 | 0.21 |
| 432 | 0.35 |

The dissolved silver values were corrected for container adsorption.

Another set of Inconel 718 test panels received high temperature oxidation treatment followed by treatment with a solution having a high concentration of silver fluoride (passivation treatment). As before, the test panels were heated to 590° C. (1100° F.) and exposed to air at that temperature for 2 hours. Once the test panels had cooled, each panel was exposed to a concentrated silver solution (silver fluoride) having a silver concentration of 50 ppm. The test panels were exposed to the concentrated silver solutions for 3 weeks. After 3 weeks, the concentrated silver solutions were removed from the test panels, the test panels were rinsed with deionized water and the test panels were allowed to dry for 8 days before exposure to potable water containing silver ions. Results for the Inconel 718 test panels receiving high temperature oxidation treatment followed by passivation treatment and 8 days of drying time (reference numeral 56) showed a fairly steady level of silver ions between about 0.33 ppm (89% of the initial concentration) and about 0.41 ppm (111% of the initial concentration) out to about 61 weeks. At about 43 weeks, the silver ion concentration dropped to 0.23 ppm, but was back up to 0.36 ppm at about 61 weeks. The high temperature oxidation treatment combined with the oxidizing agent passivation treatment demonstrated the ability to maintain acceptable antimicrobial levels of silver ions near initial levels in potable water for up to 61 weeks for Inconel 718 surfaces. Even after a number of days had passed since the last treatment (concentrated silver solution) was completed, the test panel retained its ability to maintain silver ion concentration.

TABLE 4

Inconel 718 - High Temperature Oxidation Treatment & Passivation

| Time (days) | Dissolved silver (ppm) |
| --- | --- |
| 0 | 0.37 |
| 33 | 0.33 |
| 104 | 0.41 |
| 174 | 0.41 |
| 300 | 0.23 |
| 425 | 0.36 |

The dissolved silver values were corrected for container adsorption.

Another set of Inconel 718 test panels received silver plating treatment. The entire surface of the test panels were silver plated. The test panels were plated with silver to meet the requirements of Federal Specification QQ-S-365D. The thickness of the silver plating on the test panels was about 0.013 mm (0.0005 inches). The test panels were rinsed with deionized water and the test panels were exposed to potable water containing silver ions. Results for the Inconel 718 test panels receiving silver plating treatment (reference numeral 58) showed a gradual increase in silver ion concentration between about 0.06 ppm (116% of the initial concentration) and about 0.08 ppm (122% of the initial concentration) after about 11 weeks. At about 17 weeks, the silver ion concentration increased significantly to 0.65 ppm (176% of the initial concentration). The silver ion concentration continued to increase to 0.88 ppm (238% of the initial concentration) after 27 weeks and leveled off, increasing to 0.92 ppm (249% of the initial concentration) after 45 weeks. The silver plating treatment demonstrated the ability to increase the levels of silver ions above the initial levels in the water exposed to the Inconel 718 surfaces.

TABLE 5

Inconel 718 - Silver Plating Treatment

| Time (days) | Dissolved silver (ppm) |
|---|---|
| 0 | 0.37 |
| 14 | 0.40 |
| 28 | 0.45 |
| 77 | 0.43 |
| 117 | 0.65 |
| 188 | 0.88 |
| 314 | 0.92 |

The dissolved silver values were corrected for container adsorption.

Example 2

E-BRITE®

Figure 6:
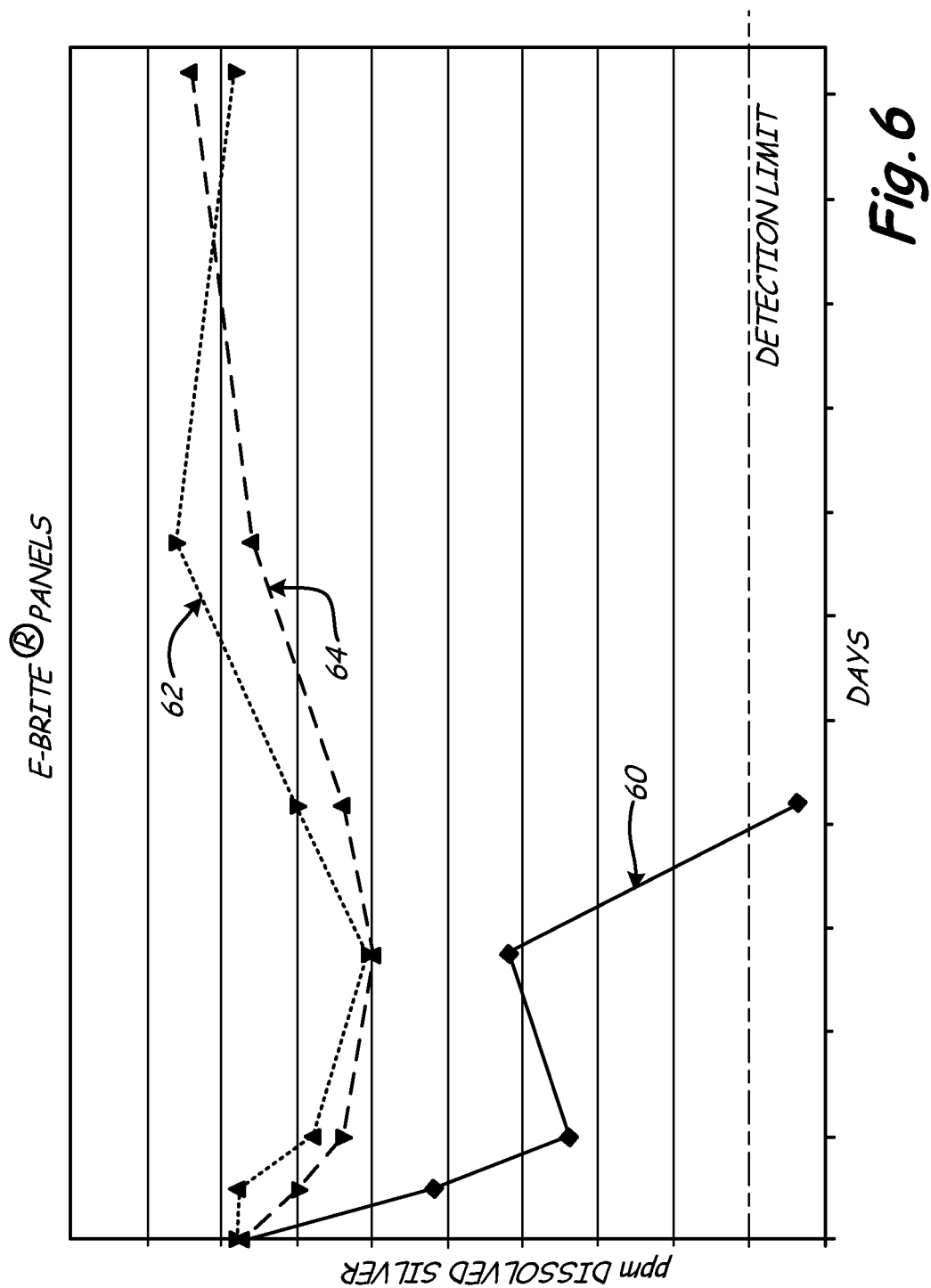
FIG. 6 is a graph illustrating silver ion concentrations in solutions contacting E-BRITE® surfaces.

Similar experiments were performed with E-BRITE® valve material. FIG. 6 and Tables 6-8 illustrate results for the E-BRITE® panel study. A set of untreated E-BRITE® test panels received no treatment before exposure to potable water containing silver ions. Results for the untreated E-BRITE® test panels (reference numeral 60) showed a rapid decrease (58%) in the amount of silver ions in the potable water after 4 weeks. Silver ion concentration increased slightly after 11 weeks, but was below the detection limit (0.05 ppm) after about 17 weeks.

TABLE 6

Untreated E-BRITE®

| Time (days) | Dissolved silver (ppm) |
|---|---|
| 0 | 0.39 |
| 14 | 0.26 |
| 28 | 0.17 |
| 77 | 0.21 |
| 117 | 0.02 |

The dissolved silver values were corrected for container adsorption.

A set of E-BRITE® test panels received high temperature oxidation treatment before exposure to potable water containing silver ions. The test panels were heated to 590° C. (1100° F.) for 2 hours. The test panels were also exposed to air at the elevated temperature for those 2 hours. Once the test panels had cooled, they were exposed to potable water containing silver ions. Results for the E-BRITE® test panels receiving high temperature oxidation treatment (reference numeral 62) showed a slight decrease (23%) in silver ion concentration after 11 weeks, but from there the concentration increased to a final silver ion concentration of 0.39 ppm (100% of the initial concentration) after about 45 weeks. The high temperature oxidation treatment demonstrated the ability to maintain an acceptable antimicrobial level of silver ions in potable water for up to 45 weeks for E-BRITE® surfaces.

TABLE 7

E-BRITE® - High Temperature Oxidation Treatment

| Time (days) | Dissolved silver (ppm) |
|---|---|
| 0 | 0.39 |
| 14 | 0.35 |
| 28 | 0.32 |
| 77 | 0.30 |
| 117 | 0.35 |
| 188 | 0.43 |
| 314 | 0.39 |

The dissolved silver values were corrected for container adsorption.

A set of E-BRITE® test panels each received treatment with a solution of silver fluoride at high concentration before exposure to potable water containing silver ions. These test panels were not heated. The test panels were each exposed to a concentrated silver solution (silver fluoride) having a silver concentration of 25 ppm. The test panels were exposed to the concentrated silver solutions for 24 hours. After 24 hours, the concentrated silver solutions were removed, the test panels were rinsed with deionized water and the test panels were exposed to potable water containing silver ions. Results for the E-BRITE® test panels receiving passivation treatment (reference numeral 64) showed a slight decrease (23%) in silver ion concentration after 11 weeks, but from there the concentration increased to a final silver ion concentration of 0.42 ppm (108% of the initial concentration) after about 45 weeks. The oxidizing agent passivation treatment alone demonstrated the ability to maintain acceptable antimicrobial levels of silver ions near initial levels in potable water for up to 45 weeks for E-BRITE® surfaces.

TABLE 8

E-BRITE® - Passivation Treatment

| Time (days) | Dissolved silver (ppm) |
|---|---|
| 0 | 0.39 |
| 14 | 0.39 |
| 28 | 0.34 |
| 77 | 0.30 |
| 117 | 0.32 |
| 188 | 0.38 |
| 314 | 0.42 |

The dissolved silver values were corrected for container adsorption.

The above Examples demonstrate the ability of treated Inconel 718 and E-BRITE® surfaces to maintain silver ion concentrations for several weeks. Extrapolation of the results suggests that the treated surfaces would maintain silver ion concentrations in potable water well beyond the ranges tested.

Figure 7:
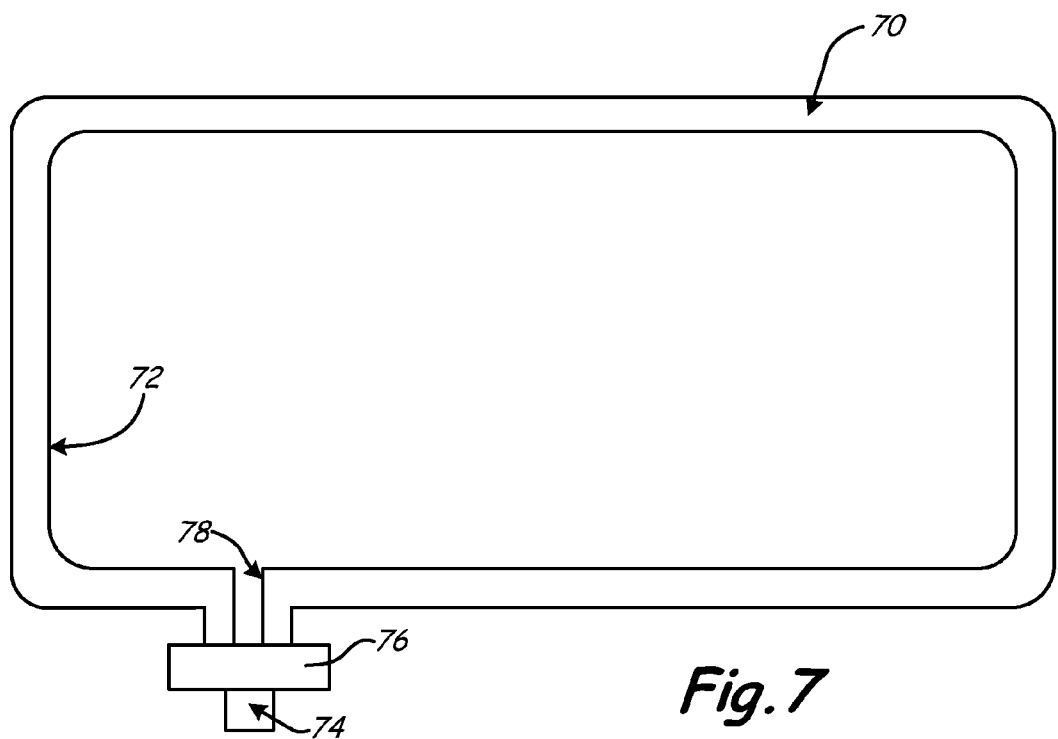
FIG. 7 is a side view of a vessel for long-term storage of potable water.

In one embodiment, the method of the present invention provides for a vessel for long-term storage of potable water. FIG. 7 illustrates a simplified side view of vessel 70. Vessel 70 includes metallic surface 72. Metallic surface 72 can be a stainless steel, a metal alloy or other metals described above. Vessel 70 also contains an outlet 74 for dispensing water contained within vessel 70. Filter 76 filters water before it is dispensed through outlet 74 to remove microbes that may have grown in the water despite the presence of a biocide. Vessel 70 having metallic surface 72 is prepared for long-term storage of potable water by oxidizing metallic surface 72 of vessel 70. Oxidizing metallic surface 72 of vessel 70 decreases the reduction potential of metallic surface 72. Metallic surface 72 of vessel 70 is also treated with a solution containing silver ions to further decrease reduction potential of metallic surface 72. FIG. 7 illustrates a side view of a simple vessel 70. Vessel 70 can also be a bellows-type tank having an expansion joint or metal bellows sidewalls. The method of the present invention is effective at treating complex geometries for vessels having small features and/or gaps.

In another embodiment, a portion of metallic surface 72 of vessel 70 can be silver plated. Vessel portion 78 is part of metallic surface 72. Since potable water dispensed from vessel 70 must flow through a volume near vessel portion 78, it is ideally located to provide a source of silver ions to increase or maintain the level of silver ions in dispensed potable water. The surface area of vessel portion 78 can be determined based on the overall volume of vessel 70 and the level of silver ions desired in potable water dispensed from vessel 70.

In another embodiment, a vessel for containing potable water comprising silver ions has a metallic surface, an outlet for discharging potable water from the vessel and a filter. A majority of electropositive elemental metals present on the metallic surface of the vessel are oxidized to prevent reduction of silver ions. Metallic surfaces of valves, tubing and other vessel and system components can also be oxidized to prevent reduction of silver ions. The filter prevents microbes from exiting the vessel at the outlet.

Embodiments of the present invention allow for the long-term storage of potable water containing a silver biocide in a vessel having a metallic surface. Oxidizing the metallic surface at a high temperature and passivating the metallic surface with a solution containing an oxidizing agent, as well as a combination of both oxidation and passivation, decrease the number of sites on the metallic surface that can react with and reduce silver ions. Once the reduction sites have been oxidized and/or passivated, potable water containing silver ions can contact the metallic surfaces without compromising the antimicrobial effect of the silver ions. Silver plating a portion of the metallic surface of the vessel also decreases the number of sites on the metallic surface that can react with and reduce silver ions. Silver plated metallic surfaces can also contribute silver ions to potable water stored in the vessel.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:

1. A method for controlling microbial growth in potable water stored in a vessel having a metallic surface, the method comprising:

heating the metallic surface of the vessel to a temperature between about 480° C. (900° F.) and about 870° C. (1600° F.), wherein the metallic surface comprises nickel;

exposing the metallic surface of the vessel to oxygen during heating to oxidize potential reduction sites on the metallic surface;

treating the metallic surface of the vessel with a solution containing an oxidizing agent after heating the metallic surface and exposing the metallic surface to oxygen; and charging potable water containing an initial concentration of silver ions to the vessel, wherein the oxidation of potential reduction sites on the metallic surface causes potable water stored in the vessel for about 110 days to contain a concentration of silver ions not less than 84% of the initial concentration.

2. The method of claim 1, wherein the metallic surface of the vessel is heated to a temperature between about 480° C. (900° F.) and about 870° C. (1600° F.) for between about 1 hour and about 24 hours.

3. The method of claim 1, wherein the metallic surface of the vessel is exposed to air at a temperature between about 480° C. (900° F.) and about 870° C. (1600° F.) for a period of time between about 60 minutes and about 4 hours to oxidize potential reduction sites on the metallic surface.

4. The method of claim 1, wherein the initial concentration of silver ions in the potable water charged to the vessel is between about 0.02 ppm and about 0.4 ppm.

5. The method of claim 1, wherein the metallic surface is treated with the solution containing an oxidizing agent for between about 2 days and about 3 weeks.

6. The method of claim 1, wherein the solution containing an oxidizing agent comprises silver ions at a concentration between about 10 ppm and about 200 ppm.

7. The method of claim 6, wherein the silver ions are formed by dissociation of one or more silver salts selected from the group consisting of silver (I) fluoride, silver sulfate, silver sulfite, silver nitrate, silver nitrite, silver acetate and combinations thereof.

8. The method of claim 1, wherein potential reduction sites on the vessel are oxidized so that a final concentration of silver ions in the potable water charged to the vessel is at least about 50% of an initial concentration of silver ions in the potable water after about 15 months.

9. The method of claim 1, wherein the metallic surface comprises an electropositive metal.

10. The method of claim 9, wherein at least a majority of exposed nickel on the metallic surface is oxidized to form compounds selected from the group consisting of nickel oxide ($NiO_2$), nickel carbonate ($NiCO_3$), nickel hydroxide ($Ni(OH)_2$) and combinations thereof.

11. The method of claim 1, wherein the metallic surface is an austenitic nickel-chromium based alloy.

12. The method of claim 1, wherein the metallic surface is a ferritic stainless steel.

* * * * *

UNITED STATES PATENT AND TRADEMARK OFFICE
CERTIFICATE OF CORRECTION

PATENT NO. : 8,685,257 B2  
APPLICATION NO. : 12/635102  
DATED : April 1, 2014  
INVENTOR(S) : Durwood Mace Beringer, John W. Steele and Timothy A. Nalette It is certified that error appears in the above-identified patent and that said Letters Patent is hereby corrected as shown below:

In the Specification  
Col. 1, Line 9  
Delete "DE-" before "NNJ06TA25C"

Signed and Sealed this  
Fifth Day of August, 2014

Michelle K. Lee  
*Deputy Director of the United States Patent and Trademark Office*